United States Patent [19]
Ishida

[11] 3,979,109
[45] Sept. 7, 1976

[54] LOCKING DEVICE IN GAS SPRING
[75] Inventor: Kunio Ishida, Yokohama, Japan
[73] Assignee: Tokico Ltd., Japan
[22] Filed: Oct. 8, 1975
[21] Appl. No.: 620,854

[30] Foreign Application Priority Data
Oct. 14, 1974   Japan............................ 49-117867

[52] U.S. Cl............................. 267/64 R; 188/300;
    248/354 H; 297/355
[51] Int. Cl.²........................................... F16F 9/49
[58] Field of Search......... 188/300; 267/64 R, 65 R;
    248/354 H; 297/355

[56] References Cited
UNITED STATES PATENTS
3,929,057   10/1975   Kondo............................... 188/300

FOREIGN PATENTS OR APPLICATIONS
261,139   4/1968   Austria............................. 188/300

*Primary Examiner*—George E. A. Halvosa
*Attorney, Agent, or Firm*—Wenderoth, Lind & Ponack

[57]   ABSTRACT

A locking device in a gas spring including a cylinder, a free piston slidably disposed in the cylinder for dividing the interior of the cylinder into a gas chamber and an oil chamber, and a piston slidably disposed in the oil chamber and having a piston rod extending outwardly from the cylinder, the locking device comprises a free piston rod secured to the free piston and projecting outwardly from the cylinder, and means secured to the cylinder for engaging with and controlling the movement of the free piston rod relative to the cylinder.

3 Claims, 3 Drawing Figures

LOCKING DEVICE IN GAS SPRING

BACKGROUND OF THE INVENTION

This invention relates to a locking device in a gas spring of the type comprising a cylinder, a free piston dividing the interior of the cylinder into a gas chamber and an oil chamber, and a piston having a piston rod and slidably disposed in the oil chamber.

When a gas spring of this type is equipped in a chair or the like it is required to adjust the overall length of the gas spring and to lock it at the adjusted position. For this end, it is usual to incorporate a valve in the piston for controlling oil flow across the piston. The valve is operated from the outside of the cylinder and, when the valve is closed, oil flow across the piston is prevented and the movement of the piston rod relative to the cylinder is prevented. But such prior art gas spring has shortcomings such that it is very difficult to prevent oil leakage across the valve and a piston seal and that the construction of a valve operating mechanism is complicated and expensive.

SUMMARY OF THE INVENTION

An object of the present invention is to provide an improved locking device for use in a gas spring of the type which is simple in construction and can lock the gas spring, namely, fix the length of the gas spring at a desired position.

The locking device according to the present invention comprises a free piston rod secured to the free piston for extending outwardly of the cylinder and means secured to the cylinder for engaging with the free piston rod and controlling the movement thereof relative to the cylinder.

Preferably, the engaging means comprises a supporting member having female screw threads on the inner circumference thereof for engaging with male screw threads formed on the outer circumference of a lock plate secured to the free piston rod. The screw thread engagement prevents the axial movement of the free piston rod normally, but allows it when the free piston rod is rotated relative to the cylinder.

By forming cutout portions in the female and male screw threads which are spaced circumferentially with each other and extend axially, it is possible to align the male screw threads with the cutout portions of the female screw threads and, at the same time, the female screw threads with the cutout portions of the male screw threads, whereby the free piston rod can move axially with respect to the cylinder freely, thus, adjusting the axial position of the free piston becomes very convenient.

DETAILED DESCRIPTION OF THE DRAWING

In order that the invention may be clearly understood reference is directed to the accompanying drawing wherein.

DETAILED DESCRIPTION OF THE EMBODIMENT

Figure 1:
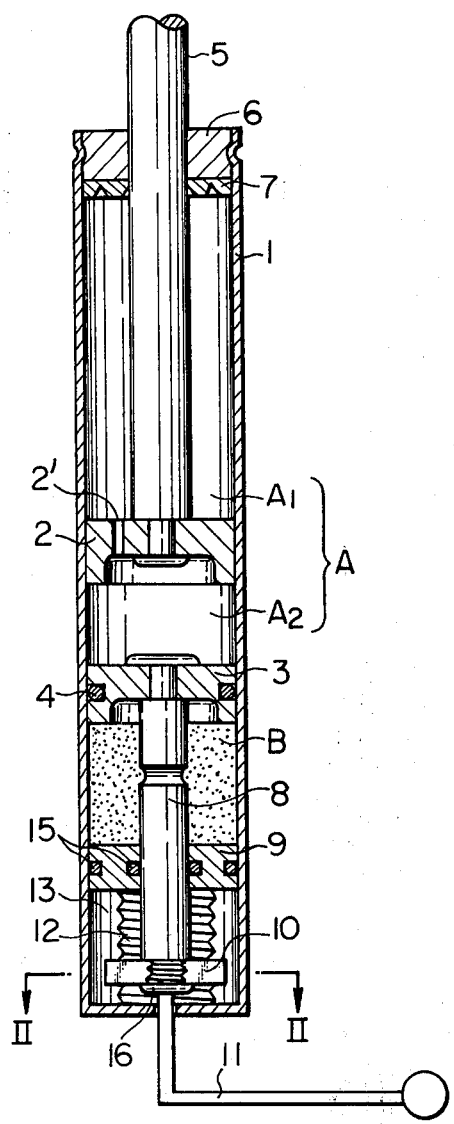
FIG. 1 is an axial section of a gas spring incorporating a locking device constructed in accordance with the present invention.

A gas spring shown in the drawing comprises a cylinder 1, a piston 2 and a free piston 3 slidably fitted in the cylinder 1. The free piston 3 having an O-ring seal 4 on the circumference thereof divides the interior of the cylinder 1 into an oil chamber A and a gas chamber B. The piston 2 partitions the oil chamber A into two oil chambers $A_1$ and $A_2$, and has a through hole 2' for communicating two oil chambers $A_1$ and $A_2$ with each other.

Figure 2:
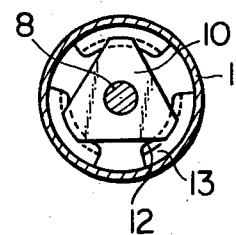
FIG. 2 is a cross-sectional view taken along line 2—2 of FIG. 1.

A piston rod 5 is secured to the piston 2 and extends outwardly from the cylinder 1 through a rod guide 6 and a packing 7. The packing 7 is disposed underside of the rod guide 6 and seals the oil chamber $A_1$ from the outside of the cylinder 1. According to the present invention, a free piston rod 8 is secured to the free piston 3, and the rod 8 slidably extends through a base cap 9 which has O-ring seals 15 on the inner and outer peripheries thereof and acts to guide the sliding movement of the rod 8 and to seal the gas chamber B from the outside of the cylinder. The free piston rod 8 has a lock plate 10 having a male screw threaded portion 14 on the outer circumference thereof as shown in FIGS. 2 and 3 and a lever 11.

A supporting member 13 having a female screw threaded portion 12 on the inner circumference thereof for engaging with the male screw threaded portion 14 of the lock plate 10 is provided on the outside of the base cap 9 and is secured to the cylinder 1. The configurations of the male and the female screw threaded portions 12 and 14 are determined such that when the lock plate 10 is rotated to the position shown in FIG. 3 the male and the female screw threads disengage from each other, and the free piston rod 8 can move freely in the axial direction with respect to the cylinder 1, and that when the lock plate 10 is rotated by means of the lever 11 the screw threads engage with each other and the axial movement of the free piston 3 is prevented.

In the embodiment shown in the drawing the lock plate 10 engages with the supporting member 13 by means of screw threads, but it will be noted that the screw threads may be substituted by any other means, for example, circumferential grooves and complementary circumferential projections.

Figure 3:
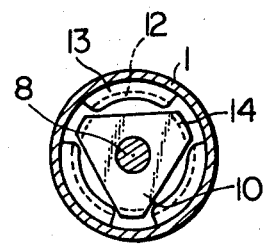
FIG. 3 is a view similar to FIG. 2.

When the lock plate 10 is rotated to the position shown in FIG. 3, the free piston 3, the free piston rod 8 and the lock plate 10 can move freely relative to the cylinder 1 as a unit. At that time, the piston rod 5 can move relative to the cylinder 1 since the gas chamber B allows the change in volume of the chambers $A_1$ and $A_2$ caused by moving in and moving out of the piston rod 5 with respect to the cylinder 1. While when the lock plate 10 takes the position shown in FIG. 2, the movement of the free piston 3 is prevented whereby movement of the gas spring can be completely locked.

As described above, the locking device of this invention is simple in construction and is operable from the outside to lock the movement of the free piston mechanically. Thus, the piston rod of the gas spring can be completely locked at a desired position.

I claim:

1. A locking device of a gas spring including a cylinder, a free piston slidably disposed in the cylinder for dividing the interior of the cylinder into a gas chamber and an oil chamber, and a piston slidably disposed in the oil chamber and having a piston rod projecting outwardly from the cylinder, the locking device comprises a free piston rod secured to the free piston and projecting outwardly from the cylinder, and means secured to the cylinder for engaging with and preventing movement of the free piston rod relative to the cylinder.

2. A locking device as set forth in claim 1, in which said engaging means comprises a supporting member having female screw threads on the inner circumference thereof for engaging with male screw threads formed on the outer circumference of a lock plate secured to the free piston rod.

3. A locking device as set forth in claim 2, in which the female screw threads and the male screw threads have a plurality of circumferentially spaced, axially extending cutout portions, whereby when the lock plate is rotated relative to the supporting member to a position such that the cutout portions of the female screw threads align with the male screw threads and the cutout portions of the male screw threads align with the female screw threads the lock plate can move freely in the axial direction with respect to the supporting member.

* * * * *